US012659400B2

(12) United States Patent　　(10) Patent No.: US 12,659,400 B2

Hong　　(45) Date of Patent: Jun. 16, 2026

(54) CONTROL INSTRUCTION METHOD, BEHAVIOR CONTROL METHOD, COMMUNICATION APPARATUS, AND COMPUTER-READABLE STORAGE MEDIUM

(71) Applicant: Beijing Xiaomi Mobile Software Co., Ltd., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 391 days.

(21) Appl. No.: 18/552,036

(22) PCT Filed: Mar. 22, 2021

(86) PCT No.: PCT/CN2021/082129

§ 371 (c)(1),
(2) Date: Sep. 22, 2023

(87) PCT Pub. No.: WO2022/198397

PCT Pub. Date: Sep. 29, 2022

(65) Prior Publication Data

US 2024/0179236 A1　　May 30, 2024

(51) Int. Cl.
*H04M 1/72454*　　(2021.01)
*H04M 1/72457*　　(2021.01)

(52) U.S. Cl.
CPC ... *H04M 1/72454* (2021.01); *H04M 1/72457* (2021.01)

(58) Field of Classification Search
CPC ................................. H04W 4/02; H04W 48/04

(Continued)

(56) References Cited

U.S. PATENT DOCUMENTS 8,744,493 B2 *　6/2014　Czaja .................... H04W 48/04
455/448
2009/0298474 A1 *　12/2009　George .................. G10L 13/00
455/412.2

(Continued)

FOREIGN PATENT DOCUMENTS

CN　　105338465 A　　2/2016
CN　　106257943 A　　12/2016

(Continued)

OTHER PUBLICATIONS

Y. Tanaka, R. Shinkuma, E. Takahashi and T. Onishi, "User cooperation mechanism for temporal traffic smoothing in mobile networks," 2016 17th International Telecommunications Network Strategy and Planning Symposium (Networks), Montreal, QC, Canada, 2016, pp. 227-232, doi: 10.1109/NETWKS.2016.7751180 (Year: 2016).*

(Continued)

*Primary Examiner* — William D Cumming

(74) *Attorney, Agent, or Firm* — Volpe Koenig

(57) ABSTRACT

A control instruction method, a behavior control method, a communication apparatus, and a computer-readable storage medium are provided. The control instruction method includes transmitting a control effective condition and instruction information to a terminal device, where the instruction information is configured to instruct the terminal device to control a non-wireless communication behavior corresponding to the instruction information in a control mode corresponding to the instruction information when the terminal device satisfies the control effective condition.

20 Claims, 7 Drawing Sheets

(58) Field of Classification Search
USPC ............................................. 455/412.2, 448
See application file for complete search history.

(56) References Cited

U.S. PATENT DOCUMENTS

2009/0298475 A1 * 12/2009 Czaja .................... H04W 48/04
455/412.2
2017/0034362 A1     2/2017 Liu
2020/0389834 A1    12/2020 Otaka
2024/0179236 A1 *   5/2024 Hong ...................... H04W 4/02

FOREIGN PATENT DOCUMENTS

CN        108513007 A      9/2018
CN        108886460 A     11/2018
CN        110536012 A     12/2019
CN        110995933 A      4/2020
JP        H08214371 A  *   8/1996   ........ H04W 52/0245
JP          2986145 B2 *  12/1999   ........ H04W 52/0212
JP          3017200 B1 *   3/2000
JP        2000184457 A  *   6/2000
JP          4134396 B2 *   8/2008
KR        20020029789 A  *   4/2002   ............ H04M 1/663
KR        100450138 B1 *   9/2004   .......... H04M 19/041

OTHER PUBLICATIONS

ISA State Intellectual Property Office of the People's Republic of China, International Search Report Issued in Application No. PCT/CN2021/082129, Dec. 22, 2021, WIPO, 4 pages.
State Intellectual Property Office of the People's Republic of China, Office Action and Search Report Issued in Application No. 2021800008054, Sep. 30, 2024, 18 pages.
ISA State Intellectual Property Office of the People's Republic of China, Written Opinion of the International Searching Authority Issued in Application No. PCT/CN2021/082129, Dec. 22, 2021, WIPO, 7 pages.

* cited by examiner

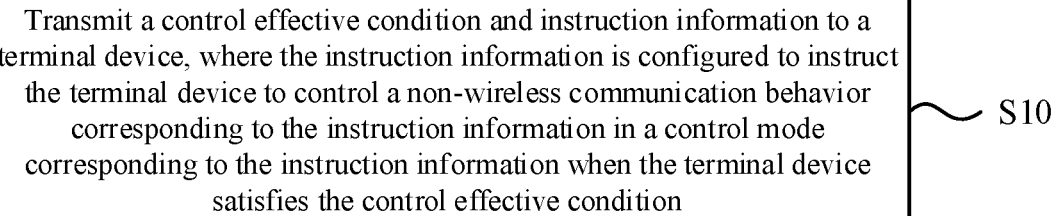

Transmit a control effective condition and instruction information to a terminal device, where the instruction information is configured to instruct the terminal device to control a non-wireless communication behavior corresponding to the instruction information in a control mode corresponding to the instruction information when the terminal device satisfies the control effective condition                                      S101

FIG. 1

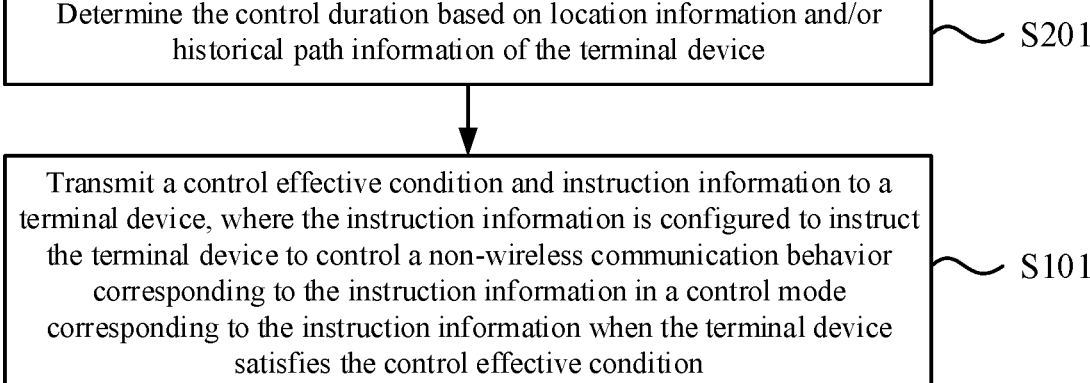

Determine the control duration based on location information and/or historical path information of the terminal device                                      S201

Transmit a control effective condition and instruction information to a terminal device, where the instruction information is configured to instruct the terminal device to control a non-wireless communication behavior corresponding to the instruction information in a control mode corresponding to the instruction information when the terminal device satisfies the control effective condition                                      S101

FIG. 2

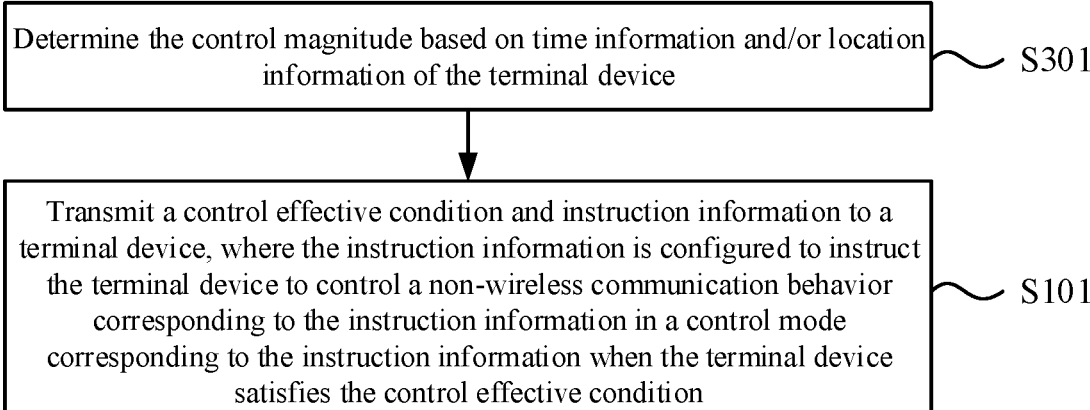

Determine the control magnitude based on time information and/or location information of the terminal device                                      S301

Transmit a control effective condition and instruction information to a terminal device, where the instruction information is configured to instruct the terminal device to control a non-wireless communication behavior corresponding to the instruction information in a control mode corresponding to the instruction information when the terminal device satisfies the control effective condition                                      S101

FIG. 3

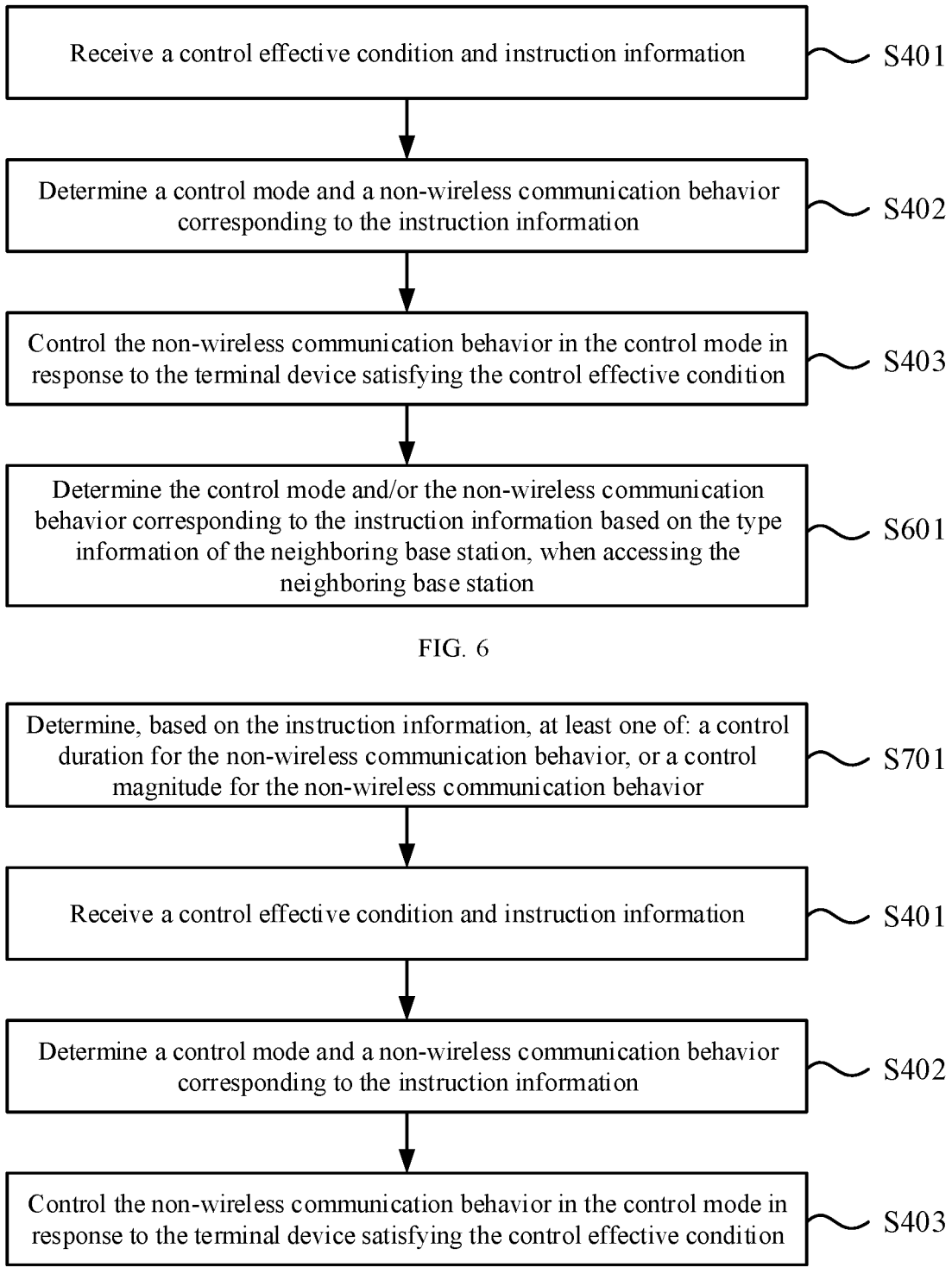

| | |
|---|---|
| Receive a control effective condition and instruction information | S401 |
| Determine a control mode and a non-wireless communication behavior corresponding to the instruction information | S402 |
| Control the non-wireless communication behavior in the control mode in response to the terminal device satisfying the control effective condition | S403 |
| Determine the control mode and/or the non-wireless communication behavior corresponding to the instruction information based on the type information of the neighboring base station, when accessing the neighboring base station | S601 |

FIG. 6

| | |
|---|---|
| Determine, based on the instruction information, at least one of: a control duration for the non-wireless communication behavior, or a control magnitude for the non-wireless communication behavior | S701 |
| Receive a control effective condition and instruction information | S401 |
| Determine a control mode and a non-wireless communication behavior corresponding to the instruction information | S402 |
| Control the non-wireless communication behavior in the control mode in response to the terminal device satisfying the control effective condition | S403 |

FIG. 7

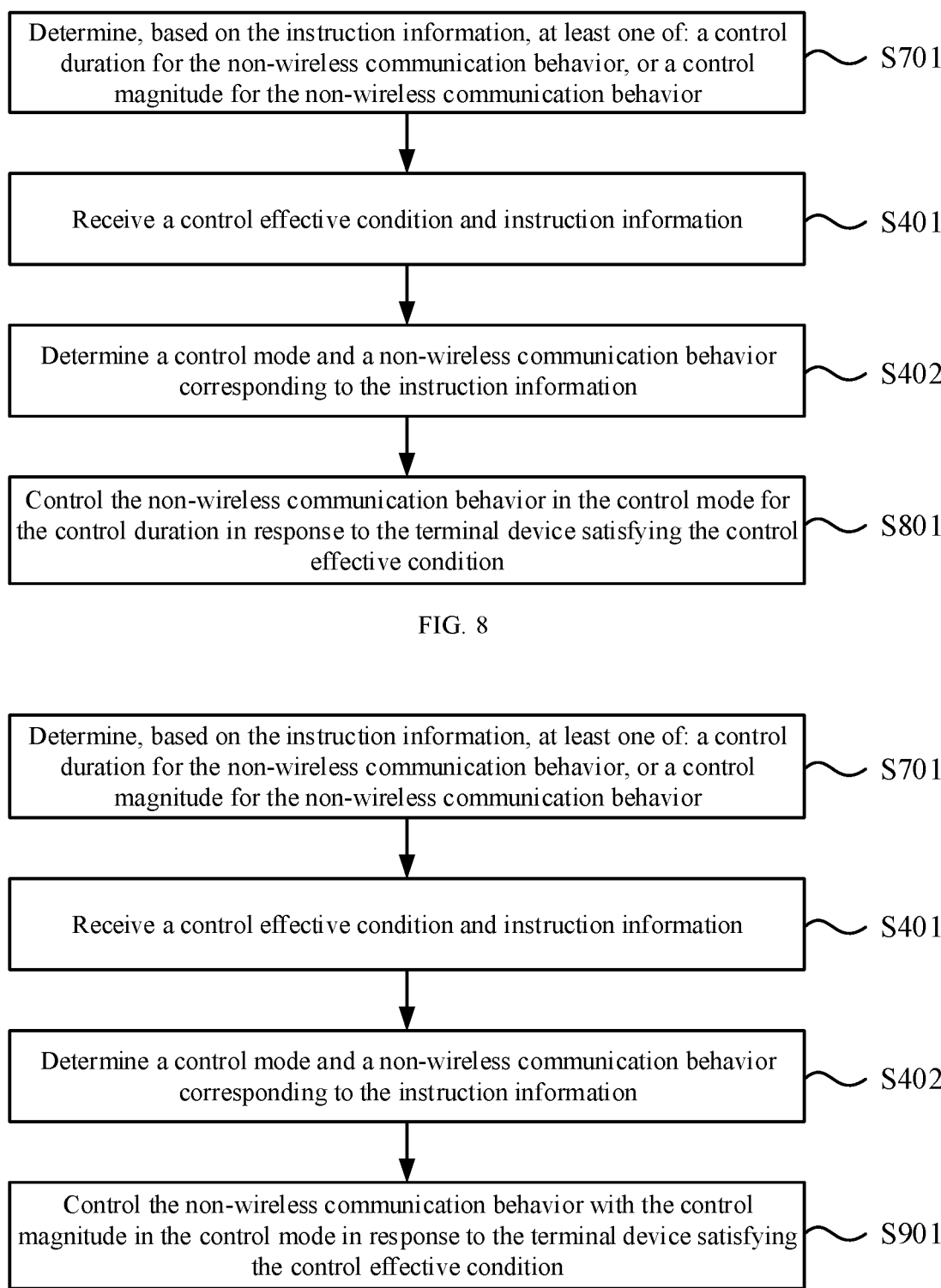

Determine, based on the instruction information, at least one of: a control duration for the non-wireless communication behavior, or a control magnitude for the non-wireless communication behavior — S701

Receive a control effective condition and instruction information — S401

Determine a control mode and a non-wireless communication behavior corresponding to the instruction information — S402

Control the non-wireless communication behavior in the control mode for the control duration in response to the terminal device satisfying the control effective condition — S801

FIG. 8

Determine, based on the instruction information, at least one of: a control duration for the non-wireless communication behavior, or a control magnitude for the non-wireless communication behavior — S701

Receive a control effective condition and instruction information — S401

Determine a control mode and a non-wireless communication behavior corresponding to the instruction information — S402

Control the non-wireless communication behavior with the control magnitude in the control mode in response to the terminal device satisfying the control effective condition — S901

FIG. 9

Behavior control apparatus 1400

| Receiving module | 1301 |

| Mode and behavior determining module | 1302 |

| Behavior controlling module | 1303 |

| Duration and magnitude determining module | 1401 |

1500

Processing component — 1522

Wireless transmitting/receiving component — 1524

Antenna component — 1526

CONTROL INSTRUCTION METHOD, BEHAVIOR CONTROL METHOD, COMMUNICATION APPARATUS, AND COMPUTER-READABLE STORAGE MEDIUM

CROSS-REFERENCE TO RELATED APPLICATIONS

This disclosure is the U.S. national phase of PCT Application No. PCT/CN2021/082129 filed on Mar. 22, 2021, the disclosure of which is incorporated herein by reference in its entirety.

TECHNICAL FIELD

The present disclosure relates to the field of communication technology, and in particular to a control instruction method, a behavior control method, a control instruction apparatus, a behavior control apparatus, a communication apparatus, and a computer-readable storage medium.

BACKGROUND

For a terminal device and a base station, the base station can control wireless communication behaviors of the terminal device. For example, the base station can configure uplink and downlink resources for the terminal device to control the terminal device to communicate wirelessly with the base station on the configured resources. With the development of communication technology, the use of terminal devices is becoming more and more widespread, and base stations can communicate wirelessly with the terminal devices in more circumstances.

However, in some circumstances, certain behaviors of the terminal device need to be restricted, which is mostly done by human intervention from the outside at present. Human intervention, however, requires manual monitoring, or even manual inspection, which on the one hand, has high labor cost, and on the other hand, is difficult to comprehensively control the behaviors that need to be restricted.

SUMMARY

In view of this, embodiments of the present disclosure provide a control instruction method, a behavior control method, a control instruction apparatus, a behavior control apparatus, a communication apparatus, and a computer-readable storage medium, in order to solve technical problems in the related art.

According to a first aspect of embodiments of the present disclosure, there is provided a control instruction method, applicable to a base station, the method including: transmitting a control effective condition and instruction information to a terminal device, where the instruction information is configured to instruct the terminal device to control a non-wireless communication behavior corresponding to the instruction information in a control mode corresponding to the instruction information when the terminal device satisfies the control effective condition.

According to a second aspect of embodiments of the present disclosure, there is provided a behavior control method, applicable to a terminal device, the method including: receiving a control effective condition and instruction information; determining a control mode and a non-wireless communication behavior corresponding to the instruction information; and controlling the non-wireless communication behavior in the control mode, in response to the terminal device satisfying the control effective condition.

According to a third aspect of embodiments of the present disclosure, there is provided a control instruction apparatus, applicable to a base station, the apparatus including: a transmitting module configured to transmit a control effective condition and instruction information to a terminal device, where the instruction information is configured to instruct the terminal device to control a non-wireless communication behavior corresponding to the instruction information in a control mode corresponding to the instruction information when the terminal device satisfies the control effective condition.

According to a fourth aspect of embodiments of the present disclosure, there is provided a behavior control apparatus, applicable to a terminal device, the apparatus including: a receiving module configured to receive a control effective condition and instruction information; a mode and behavior determining module configured to determine a control mode and a non-wireless communication behavior corresponding to the instruction information; and a behavior controlling module configured to control the non-wireless communication behavior in the control mode, in response to the terminal device satisfying the control effective condition.

According to a fifth aspect of embodiments of the present disclosure, there is provided a communication apparatus, including: a processor; and a memory storing instructions executable by the processor, where the processor is configured to perform the above control instruction method and/or behavior control method.

According to a sixth aspect of embodiments of the present disclosure, there is provided a computer-readable storage medium storing a computer program, which is executed by a processor to perform steps in the above control instruction method and/or behavior control method.

With the embodiments of the present disclosure, a non-wireless communication behavior of a terminal device is controlled by transmitting a control effective condition and instruction information from a base station to the terminal device. Since the base station can communicate with a wide range of terminal devices, for example, transmit the instruction information to terminal devices within its coverage by broadcast, the base station can relatively comprehensively control non-wireless communication behaviors of the terminal devices within its coverage, without a large amount of manual participation, which is conducive to saving costs. Moreover, whether the control is to be performed or not can be determined by the terminal device according to whether or not it satisfies the control effective condition, which is conducive to avoiding an impact on the user experience due to unnecessary control.

BRIEF DESCRIPTION OF DRAWINGS

To describe technical solutions in embodiments of the present disclosure more clearly, drawings required in the description of the embodiments will be briefly introduced below. It is apparent that the drawings described below merely illustrate some embodiments of the present disclosure, and other drawings may be obtained by those ordinary skilled in the art based on these drawings without paying any creative efforts.

FIG. 1 is a schematic flowchart illustrating a control instruction method according to an embodiment of the present disclosure.

FIG. 2 is a schematic flowchart illustrating a control instruction method according to another embodiment of the present disclosure.

FIG. 3 is a schematic flowchart illustrating a control instruction method according to yet another embodiment of the present disclosure.

FIG. 6 is a schematic flowchart illustrating a behavior control method according to yet another embodiment of the present disclosure.

FIG. 7 is a schematic flowchart illustrating a behavior control method according to yet another embodiment of the present disclosure.

FIG. 8 is a schematic flowchart illustrating a behavior control method according to yet another embodiment of the present disclosure.

FIG. 9 is a schematic flowchart illustrating a behavior control method according to yet another embodiment of the present disclosure.

DETAILED DESCRIPTION

Figures 4, 5:
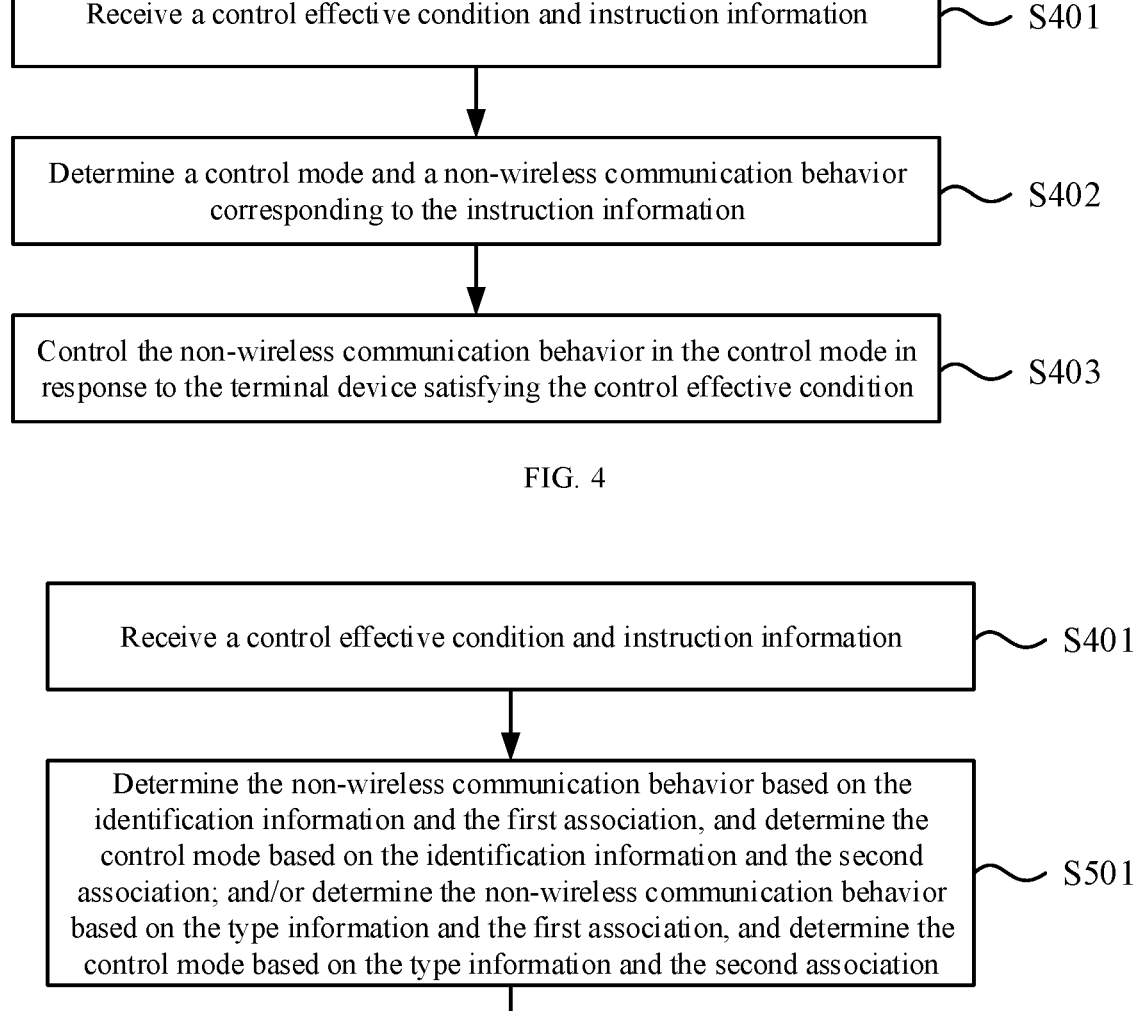
FIG. 4 is a schematic flowchart illustrating a behavior control method according to an embodiment of the present disclosure.
FIG. 5 is a schematic flowchart illustrating a behavior control method according to another embodiment of the present disclosure.

Technical solutions in embodiments of the present disclosure will be described clearly and completely below in conjunction with drawings in the embodiments of the present disclosure. It is apparent that the described embodiments are merely part of the embodiments of the present disclosure rather than all of the embodiments. Other embodiments obtained by those ordinary skilled in the art, based on the embodiments in the present disclosure, without paying any creative efforts, shall all fall within the scope of protection of the present disclosure.

FIG. 1 is a schematic flowchart illustrating a control instruction method according to an embodiment of the present disclosure. The control instruction method shown in this embodiment is applicable to a base station, which includes but is not limited to a base station in a communication system such as a 4G base station, a 5G base station, and a 6G base station. The base station may communicate with a terminal device serving as user equipment, which includes but is not limited to a communication apparatus such as a mobile phone, a tablet computer, a wearable device, a sensor, and an IoT (Internet of Things) device.

In an embodiment, the terminal device may be a terminal device to which a behavior control method according to any one of the subsequent embodiments is applicable.

As shown in FIG. 1, the control instruction method may include the following step S101.

At step S101, a control effective condition and instruction information are transmitted to a terminal device. Where the instruction information is configured to instruct the terminal device to control a non-wireless communication behavior corresponding to the instruction information in a control mode corresponding to the instruction information when the terminal device satisfies the control effective condition.

In an embodiment, the base station may transmit the instruction information and the control effective condition to the terminal device. The instruction information may be configured to instruct the terminal device receiving the instruction information, and specifically to instruct the terminal device to control the non-wireless communication behavior corresponding to the instruction information in the control mode corresponding to the instruction information when the terminal device satisfies the control effective condition.

In an embodiment, the behavior corresponding to the instruction information may be further defined as a non-wireless communication behavior. In other words, the terminal device controls a behavior other than a wireless communication behavior based on the instruction information.

In an embodiment, the base station transmits the control effective condition and the instruction information to the terminal device in a mode including at least one of: broadcast, multicast, or unicast.

In an embodiment, in the case where the control effective condition and the instruction information are transmitted in the same mode, the control effective condition and the instruction information may be carried by the same information unit, for example, both the control effective condition and the instruction information are carried in a single system information block for transmission.

In an embodiment, the instruction information may include system information.

In the case where the base station is a 4G base station, e.g., an EUTRAN (Evolved Universal Terrestrial Radio Access Network) base station, the instruction information may be carried in a system information block SIB1. In the case where the base station is a 5G base station, e.g., an NR (New Radio) base station, the instruction information may be carried in the minimum system information (minimum SI). In both cases, the system information is broadcast, and the instruction information may be transmitted to the terminal device by broadcast.

In addition, in the case where the base station is a 5G base station, a new system information block may be introduced in other SI to carry the instruction information. In this case, the system information is transmitted to the terminal device on demand, which is equivalent to being transmitted to the terminal device by unicast.

In an embodiment, the control effective condition may be carried in the system information described above and transmitted to the terminal device, or may be carried in unicast signaling and transmitted to the terminal device. For example, the unicast signaling may be RRCConnectionReconfiguration signaling or RRCReconfiguration signaling during RRC (Radio Resource Control) connection establishment, RRCConnectionRelease signaling or RRCRelease signaling during RRC connection release, or other signaling such as OtherConfig signaling.

In an embodiment, the terminal device, after receiving the instruction information, may determine the control mode corresponding to the instruction information, and the non-wireless communication behavior corresponding to the instruction information.

In an embodiment, there may be an association between the instruction information and the non-wireless communication behavior, referred to as a first association. The first association may be pre-negotiated between the base station and the terminal device, may be determined by the base station alone and transmitted to the terminal device in advance, or may be pre-stored in the terminal device, for example, as specified by a communication protocol.

In an embodiment, there may be an association between the instruction information and the control mode, referred to as a second association. The second association may be pre-negotiated between the base station and the terminal device, may be determined by the base station alone and transmitted to the terminal device in advance, or may be pre-stored in the terminal device, for example, as specified by a communication protocol.

It should be noted that, "in advance" as defined in the above embodiments, may refer to before the base station transmits the instruction information to the terminal device.

In an embodiment, after receiving the instruction information, the terminal device may determine a non-wireless communication behavior (which may include one or more behaviors) corresponding to a value in the instruction information based on the value and the first association, as well as determine a control mode corresponding to a value in the instruction information based on the value and the second association, and then control the determined non-wireless communication behavior based on the determined control mode. The type of the value in the instruction information includes, but is not limited to, an integer type, an enumeration type, and a string type.

In an embodiment, the control effective condition includes at least one of: a location condition, a terminal type condition, or a service type condition.

In an embodiment, the terminal device satisfying the location condition includes at least one of: the terminal device being located within a target cell; the terminal device being located at target coordinates; or the terminal device being located at a target altitude.

In an embodiment, the non-wireless communication behavior includes at least one of: an audio output behavior, a display behavior, a prompt behavior, or a power supply behavior.

For different non-wireless communication behaviors, the control effective conditions and the control modes may be the same or different. Moreover, for different non-wireless communication behaviors, information in the instruction information corresponding to the control modes may be the same, but may represent different meanings. For example, the bit in the instruction information corresponding to the control mode is 01, which means that the control mode is to reduce an output volume for the audio output behavior, and means that the control mode is to adjust to a vibration mode for the prompt behavior.

For example, the non-wireless communication behavior is the audio output behavior, and the control mode may include one of Turn Up, Turn Down, Turn Off, and adjusting to a non-loudspeaker mode. The control effective condition includes at least one of the terminal type condition or the service type condition.

For the audio output behavior, Turn Up means to increase the output volume, Turn Down means to reduce the output volume, Turn Off means to mute, and adjusting to the non-loudspeaker mode means to adjust to a headphone output mode, in which no audio can be output if no headphones are applied, and audio may be output by the headphones after the headphones are applied. The terminal type condition means a target terminal type, such as a game phone, a business phone, and a non-business phone. The service type condition means an operation with a target service type. Then control may be performed when the type of the terminal device is the target terminal type, and/or the terminal device is performing the operation with the target service type.

For example, the non-wireless communication behavior is the display behavior which includes, but is not limited to, displaying images and videos and other screen-related behaviors, the control mode may include one of Turn Up, Turn Down, and Turn Off, and the control effective condition includes the service type condition.

For the display behavior, Turn Up means to increase a display effect, Turn Down means to reduce the display effect, and Turn Off means to turn off the screen. The display effect includes, but is not limited to, one of brightness, chroma, and contrast. The service type condition means an operation with a target service type. Then control may be performed when the terminal device is performing the operation with the target service type.

For example, the non-wireless communication behavior is the prompt behavior, and the control mode may include one of adjusting to a ringing mode, adjusting to a vibration mode, adjusting to a silent mode, and adjusting to a vibration and ringing mode. The control effective condition includes at least one of the location condition or the service type condition.

For the prompt behavior, the prompt behavior may be adjusted to the corresponding mode based on the control mode, or no adjustment is required if it is already in the corresponding mode. The location condition means being within a target altitude range, and the service type condition means an operation with a target service type. Then control may be performed when the terminal device is within the target altitude range and/or the terminal device is performing the operation with the target service type.

For example, the non-wireless communication behavior is the power supply behavior, the control mode may include one of adjusting to a power-saving mode and adjusting to a normal power supply mode, and the control effective condition includes the service type condition.

For the power supply behavior, the power supply behavior may be adjusted to the corresponding mode based on the control mode, or no adjustment is required if it is already in the corresponding mode. The service type condition means an operation with a target service type. Then, control may be performed when the terminal device is performing the operation with the target service type.

With the embodiments of the present disclosure, a non-wireless communication behavior of a terminal device is controlled by transmitting a control effective condition and instruction information from a base station to the terminal device. Since the base station can communicate with a wide range of terminal devices, for example, transmit the instruction information to terminal devices within its coverage by broadcast, the base station can relatively comprehensively control non-wireless communication behaviors of the terminal devices within its coverage, without a large amount of manual participation, which is conducive to saving costs.

Moreover, whether the control is to be performed or not can be determined by the terminal device according to whether or not it satisfies the control effective condition, which is conducive to avoiding an impact on the user experience due to unnecessary control.

In some embodiments, the base station includes at least one of: a subway base station or a high-speed railway base station.

In the case of a subway base station, for example, since the subway has a relatively enclosed space as a means of public transportation, some behaviors of the terminal device, such as audio playback via loudspeakers, may have a greater impact on other passengers on the subway. Some cities (e.g., Shanghai, and Suzhou) have prohibited such behaviors, but such prohibition requires personal qualities of passengers on the one hand, however, the personal qualities of the passengers vary, and not everyone can comply with the rules tacitly, so on the other hand, it requires a certain degree of human monitoring, which increases labor costs. Moreover, it is not a question of the qualities of some passengers, for example, passengers, who are new to the city and ride the subway, are not aware of the prohibited behaviors because they do not see the prohibition signs, which also requires manual reminders to achieve the desired effect.

Coverage of the subway base station includes areas along the subway, and the control effective conditions and instruction information may be transmitted to terminal devices of all passengers traveling on the subway through the subway base station.

For example, the non-wireless communication behavior corresponding to the instruction information is the audio output behavior, the corresponding control mode is Turn Off, and the control effective condition is that the service type is a live broadcast watching service. After receiving the instruction information, the passenger's terminal device may first determine whether the service it is carrying out is the live broadcast watching service. If it is the live broadcast watching service, then the terminal device may be adjusted to mute, so as to avoid affecting other passengers. If it is not the live broadcast watching service, for example, it is a call service, then there is no need to adjust the terminal device to mute to ensure that the call is carried out smoothly.

No human monitoring is required in the above process, which saves labor costs, and does not cause omissions of certain terminal devices, comprehensively and effectively controlling the non-wireless communication behaviors of the terminal devices that are mainly prohibited on the subway. Moreover, whether to control or not may be analyzed by the terminal device based on the actual situation, and control is to be performed only when the terminal device satisfies the control effective condition; otherwise, no control is to be performed, avoiding an impact on the user experience due to unnecessary control.

In an embodiment, the instruction information carries at least one of: identification information of the non-wireless communication behavior or type information of the base station. Where the first association is an association between the identification information and the non-wireless communication behavior, and the second association is an association between the identification information and the control mode; and/or the first association is an association between the type information and the non-wireless communication behavior, and the second association is an association between the type information and the control mode.

In an embodiment, the instruction information may carry the identification information of the non-wireless communication behavior to be controlled. The terminal device may determine the non-wireless communication behavior to be controlled based on the first association and the identification information, as well as determine the control mode based on the second association and the identification information.

The base station may determine the non-wireless communication behavior to be controlled as well as its identification information as needed, and then carry the identification information in the instruction information to be transmitted to the terminal device, thereby instructing the terminal device to control the non-wireless communication behavior in the corresponding control mode.

In an embodiment, the instruction information may carry the type information of the base station, and the terminal device may determine the non-wireless communication behavior to be controlled based on the first association and the type information, as well as determine the control mode based on the second association and the type information.

For different types of base stations, the non-wireless communication behaviors to be controlled and the control modes may be different. The instruction information transmitted from the base station to the terminal device may carry the type information of the base station from which the instruction information is transmitted. In this way, the terminal device may receive the instruction information from different base stations within the coverage of the different base stations, to acquire the type of the base station from the instruction information, and then determine, based on the type of the base station, the non-wireless communication behavior to be controlled by the base station with that type, as well as the control mode.

In an embodiment, the instruction information further carries type information of a neighboring base station of the base station. Where the instruction information is further configured to instruct the terminal device to determine, based on the type information of the neighboring base station, the control mode and/or the non-wireless communication behavior corresponding to the instruction information, when the terminal device accesses the neighboring base station.

In an embodiment, the non-wireless communication behaviors to be controlled and the control modes may be different for different types of base stations. The base station may acquire the type information of the neighboring base station, and then carry the type information of the neighboring base station in the instruction information to be transmitted to the terminal device. When the terminal device accesses the neighboring base station (e.g., resides on the neighboring base station or establishes a communication connection with the neighboring base station), the terminal device may determine the non-wireless communication behavior to be controlled by the neighboring base station and the corresponding control mode directly based on the type information of the neighboring base station. In this way, upon receiving the instruction information from the neighboring base station, the terminal device may timely control the non-wireless communication behavior in the corresponding control mode.

In an embodiment, the instruction information is further configured to instruct at least one of: a control duration for the non-wireless communication behavior, or a control magnitude for the non-wireless communication behavior.

In an embodiment, in addition to instructing the terminal device the non-wireless communication behavior to be controlled and the corresponding control mode via the instruction information, the base station may instruct the terminal device a specific control duration, control magnitude, and the like via the instruction information.

The control duration is a duration in which the non-wireless communication behavior is controlled in the control mode, and the control magnitude is a magnitude of control of the non-wireless communication behavior in the control mode.

For example, the non-wireless communication behavior is the audio output behavior, the control mode is Turn Down, the control duration is 20 minutes, and the control magnitude is 50%, then the terminal device may reduce its audio output volume by 50% and hold it for 20 minutes.

Accordingly, more accurate control of the terminal device can be realized, which is conducive to improving the user experience.

FIG. 2 is a schematic flowchart illustrating a control instruction method according to another embodiment of the present disclosure. As shown in FIG. 2, in some embodiments, in response to the instruction information being further configured to instruct the control duration, the method includes step S201 in addition to step S101.

At step S201, the control duration is determined based on location information and/or historical path information of the terminal device.

In an embodiment, the base station may determine the control duration based on the location information and/or the historical path information of the terminal device. For example, the base station may predict, based on the location information and/or the historical path information of the terminal device, how much more time it will take for the terminal device to leave the environment where the non-wireless communication behavior is to be restricted, and then determine the control duration based on that time.

In the case of travel of the terminal device on the subway, as an example, the historical path information of the terminal device starts from station A and arrives at station E via station B, station C, and station D in turn, for example. In order to simplify the description, it is assumed that four segments AB, BC, CD, and DE have the same lengths, and the total time from station A to station E is 40 minutes.

When a base station located in the vicinity of station D determines that the terminal device travels from station A to station D via stations B and C (for example, based on communication with other base stations that the terminal device passes through along the way), it may be determined that the terminal device ends at station E based on the historical path information of the terminal device, i.e., the terminal device still needs to travel a distance of DE on the subway to leave the subway car, and it may be determined that the duration for the terminal device to travel from station D to station E is 10 minutes. Then the instruction information may be configured to instruct the terminal device that the control duration is 10 minutes.

For example, for the control of the audio output of the terminal device, the terminal device may be controlled to mute for 10 minutes from station D to station E, and after 10 minutes, the terminal device may be unmuted and output sound normally. Accordingly, on the one hand, it is possible to ensure that the terminal device remains muted during travel from station D to station E on the subway, so as to avoid affecting other passengers. On the other hand, it is possible to accurately determine the duration the terminal device is in the environment where its behavior is to be restricted. For example, after the aforementioned 10 minutes, it may be predicted that the terminal device has left the subway car, and even if the terminal device is still within the coverage of the base station in the vicinity of station D, the terminal device may be unmuted so as to avoid adverse effects on the user of the terminal device.

It should be noted that in order to determine the control duration more accurately, on the basis of considering the location information and/or the historical path information, time information may be further considered, such as determining the historical path information of the terminal device at the current time, and then performing the above steps based on the determined historical path information.

FIG. 3 is a schematic flowchart illustrating a control instruction method according to yet another embodiment of the present disclosure. As shown in FIG. 3, in some embodiments, in response to the instruction information being further configured to instruct the control magnitude, the method includes step S301 in addition to step S101.

At step S301, the control magnitude is determined based on the time information and/or the location information of the terminal device.

In an embodiment, the base station may determine the control magnitude based on the time information and the location information of the terminal device. For example, the base station may predict, based on the time information and the location information of the terminal device, a density of passengers in the environment where the terminal device is currently located, and then determine the control magnitude based on the density.

As an example, the terminal device is travelling on the subway, and the audio output of the terminal device is controlled. For example, the time information is 8:00 a.m., and there are a larger number of passengers boarding and alighting at the station where the terminal device is located. It may be determined that the density of passengers in the environment where the terminal device is located is relatively high, then the terminal device may be controlled to lower its volume with a large magnitude, for example, lower its volume to mute at most. For example, the time information is 10:00 p.m., and there are fewer passengers boarding and alighting near the station where the terminal device is located. It may be determined that the density of passengers in the environment where the terminal device is located is relatively low, then the terminal device may still be controlled to lower its volume with a small magnitude.

Accordingly, on the one hand, it is possible to ensure that the volume of the terminal device may not be too loud during the subway ride, so as to avoid affecting other passengers. On the other hand, it is possible to accurately determine the density of passengers in the environment where the behavior of the terminal device is to be restricted, and determine, based on the density, the adjustment magnitude of the volume, so as to avoid affecting the user experience due to lowering of the volume too much in the case of very few or even no passengers on the subway.

FIG. 4 is a schematic flowchart illustrating a behavior control method according to an embodiment of the present disclosure. The behavior control method shown in this embodiment is applicable to a terminal device, which includes but is not limited to a communication apparatus such as a mobile phone, a tablet computer, a wearable device, a sensor, and an IoT device. The terminal device, as user equipment, may communicate with a base station, which includes but is not limited to a base station in a communication system such as a 4G base station, a 5G base station, and a 6G base station.

In an embodiment, the base station may be the base station to which the control instruction method according to any one of the above embodiments is applicable.

As shown in FIG. 4, the behavior control method may include the following steps S401 to S403.

At step S401, a control effective condition and instruction information are received.

At step S402, a control mode and a non-wireless communication behavior corresponding to the instruction information are determined.

At step S403, in response to the terminal device satisfying the control effective condition, the non-wireless communication behavior is controlled in the control mode.

In an embodiment, the base station may transmit the instruction information to the terminal device. The instruction information may be configured to instruct the terminal device receiving the instruction information, and specifically to instruct the terminal device to control the non-wireless communication behavior corresponding to the instruction information in the control mode corresponding to the instruction information.

It should be noted that, the behavior corresponding to the instruction information may be further defined as a non-communication behavior. In other words, the terminal device controls a behavior other than a communication behavior based on the instruction information.

In an embodiment, the base station may transmit the instruction information and the control effective condition to the terminal device. The instruction information may be configured to instruct the terminal device receiving the instruction information, and specifically to instruct the terminal device to control the non-wireless communication behavior corresponding to the instruction information in the control mode corresponding to the instruction information when the terminal device satisfies the control effective condition.

In an embodiment, the behavior corresponding to the instruction information may be further defined as a non-wireless communication behavior. In other words, the terminal device controls a behavior other than a wireless communication behavior based on the instruction information.

In an embodiment, the base station transmits the control effective condition and the instruction information to the terminal device in a mode including at least one of: broadcast, multicast, or unicast.

In an embodiment, in the case where the control effective condition and the instruction information are transmitted in the same mode, the control effective condition and the instruction information may be carried by the same information unit. For example, both the control effective condition and the instruction information are carried in a single system information block for transmission.

In an embodiment, the instruction information may include system information.

In the case where the base station is a 4G base station, e.g., an EUTRAN (Evolved Universal Terrestrial Radio Access Network) base station, the instruction information may be carried in a system information block SIB1. In the case where the base station is a 5G base station, e.g., an NR (New Radio) base station, the instruction information may be carried in the minimum system information (minimum SI). In both cases, the system information is broadcast, and the instruction information may be transmitted to the terminal device by broadcast.

In addition, in the case where the base station is a 5G base station, a new system information block may be introduced in other SI to carry the instruction information. In this case, the system information is transmitted to the terminal device on demand, which is equivalent to being transmitted to the terminal device by unicast.

In an embodiment, the control effective condition may be carried in the system information described above and transmitted to the terminal device, or may be carried in unicast signaling and transmitted to the terminal device. For example, the unicast signaling may be RRCConnectionReconfiguration signaling or RRCReconfiguration signaling during RRC (Radio Resource Control) connection establishment, RRCConnectionRelease signaling or RRCRelease signaling during RRC connection release, or other signaling such as OtherConfig signaling.

In an embodiment, the terminal device, after receiving the instruction information, may determine the control mode corresponding to the instruction information, and the non-wireless communication behavior corresponding to the instruction information.

In an embodiment, there may be an association between the instruction information and the non-wireless communication behavior, referred to as a first association. The first association may be pre-negotiated between the base station and the terminal device, may be determined by the base station alone and transmitted to the terminal device in advance, or may be pre-stored in the terminal device, for example, as specified by a communication protocol.

In an embodiment, there may be an association between the instruction information and the control mode, referred to as a second association. The second association may be pre-negotiated between the base station and the terminal device, may be determined by the base station alone and transmitted to the terminal device in advance, or may be pre-stored in the terminal device, for example, as specified by a communication protocol.

It should be noted that, "in advance" as defined in the above embodiments may refer to before the base station transmits the instruction information to the terminal device.

In an embodiment, after receiving the instruction information, the terminal device may determine a non-wireless communication behavior (which may include one or more behaviors) corresponding to a value in the instruction information based on the value and the first association, as well as determine a control mode corresponding to a value in the instruction information based on the value and the second association, and then control the determined non-wireless communication behavior based on the determined control mode. The type of the value in the instruction information includes, but is not limited to, an integer type, an enumeration type, and a string type.

In an embodiment, the control effective condition includes at least one of: a location condition, a terminal type condition, or a service type condition.

In an embodiment, the terminal device satisfying the location condition includes at least one of: the terminal device being located within a target cell; the terminal device being located at target coordinates; or the terminal device being located at a target altitude.

In an embodiment, the non-wireless communication behavior includes at least one of: an audio output behavior, a display behavior, a prompt behavior, or a power supply behavior.

For different non-wireless communication behaviors, the control effective conditions and the control modes may be the same or different. Moreover, for different non-wireless communication behaviors, information in the instruction information corresponding to the control modes may be the same, but may represent different meanings. For example, the bit in the instruction information corresponding to the control mode is 01, which means that the control mode is to reduce an output volume for the audio output behavior, and means that the control mode is to adjust to a vibration mode for the prompt behavior.

For example, the non-wireless communication behavior is the audio output behavior, the control mode may include one of Turn Up, Turn Down, Turn Off, and adjusting to a non-loudspeaker mode, and the control effective condition includes at least one of the terminal type condition or the service type condition.

For the audio output behavior, Turn Up means to increase the output volume, Turn Down means to reduce the output volume, Turn Off means to mute, and adjusting to the non-loudspeaker mode means to adjust to a headphone output mode, in which no audio can be output if no headphones are applied, and audio may be output by the headphones after the headphones are applied. The terminal type condition means a target terminal type, such as a game phone, a business phone, and a non-business phone. The service type condition means an operation with a target service type. Then control may be performed when the type of the terminal device is the target terminal type, and/or the terminal device is performing the operation with the target service type.

For example, the non-wireless communication behavior is the display behavior which includes, but is not limited to, displaying images and videos and other screen-related behaviors, the control mode may include one of Turn Up, Turn Down, and Turn Off, and the control effective condition includes the service type condition.

For the display behavior, Turn Up means to increase a display effect, Turn Down means to reduce the display effect, and Turn Off means to turn off the screen. The display effect includes, but is not limited to, one of brightness, chroma, and contrast. The service type condition means an operation with a target service type. Then control may be performed when the terminal device is performing the operation with the target service type.

For example, the non-wireless communication behavior is the prompt behavior, the control mode may include one of adjusting to a ringing mode, adjusting to a vibration mode, adjusting to a silent mode, and adjusting to a vibration and ringing mode, and the control effective condition includes at least one of the location condition or the service type condition.

For the prompt behavior, the prompt behavior may be adjusted to the corresponding mode based on the control mode, or no adjustment is required if it is already in the corresponding mode. The location condition means being within a target altitude range, and the service type condition means an operation with a target service type. Then control may be performed when the terminal device is within the target altitude range and/or the terminal device is performing the operation with the target service type.

For example, the non-wireless communication behavior is the power supply behavior, the control mode may include one of adjusting to a power-saving mode and adjusting to a normal power supply mode, and the control effective condition includes the service type condition.

For the power supply behavior, the power supply behavior may be adjusted to the corresponding mode based on the control mode, or no adjustment is required if it is already in the corresponding mode. The service type condition means an operation with a target service type. Then control may be performed when the terminal device is performing the operation with the target service type.

With the embodiments of the present disclosure, a non-wireless communication behavior of a terminal device is controlled by transmitting a control effective condition and instruction information from a base station to the terminal device. Since the base station can communicate with a wide range of terminal devices, for example, transmit the instruction information to terminal devices within its coverage by broadcast, the base station can relatively comprehensively control non-wireless communication behaviors of the terminal devices within its coverage, without a large amount of manual participation, which is conducive to saving costs. Moreover, whether the control is to be performed or not can be determined by the terminal device according to whether or not it satisfies the control effective condition, which is conducive to avoiding an impact on the user experience due to unnecessary control.

In some embodiments, the base station includes at least one of: a subway base station or a high-speed railway base station.

In the case of a subway base station, for example, since the subway has a relatively enclosed space as a means of public transportation, some behaviors of the terminal device, such as audio playback via loudspeakers, may have a greater impact on other passengers on the subway. Some cities (e.g., Shanghai, and Suzhou) have prohibited such behaviors, but such prohibition requires personal qualities of passengers on the one hand, however, the personal qualities of the passengers vary, and not everyone can comply with the rules tacitly, so on the other hand, it requires a certain degree of human monitoring, which increases labor costs. Moreover, it is not a question of the qualities of some passengers, for example, passengers, who are new to the city and ride the subway, are not aware of the prohibited behaviors because they do not see the prohibition signs, which also requires manual reminders to achieve the desired effect.

Coverage of the subway base station includes areas along the subway, and the control effective conditions and instruction information may be transmitted to terminal devices of all passengers traveling on the subway through the subway base station.

For example, the non-wireless communication behavior corresponding to the instruction information is the audio output behavior, the corresponding control mode is Turn Off, and the control effective condition is that the service type is a live broadcast watching service. After receiving the instruction information, the passenger's terminal device may first determine whether the service it is carrying out is the live broadcast watching service. If it is the live broadcast watching service, then the terminal device may be adjusted to mute, so as to avoid affecting other passengers. If it is not the live broadcast watching service, for example, it is a call service, then there is no need to adjust the terminal device to mute to ensure that the call is carried out smoothly.

No human monitoring is required in the above process, which saves labor costs, and does not cause omissions of certain terminal devices, comprehensively and effectively controlling the non-wireless communication behaviors of the terminal devices that are mainly prohibited on the subway. Moreover, whether to control or not may be analyzed by the terminal device based on the actual situation, and control is to be performed only when the terminal device satisfies the control effective condition; otherwise, no control is to be performed, avoiding an impact on the user experience due to unnecessary control.

FIG. 5 is a schematic flowchart illustrating a behavior control method according to another embodiment of the present disclosure and includes steps S401 and S403. As shown in FIG. 5, in some embodiments, the instruction information includes at least one of: identification information of the non-wireless communication behavior or type information of the base station, where the first association is an association between the identification information and the non-wireless communication behavior, and the second association is an association between the identification information and the control mode; and/or the first association is an association between the type information and the non-wireless communication behavior, and the second association is an association between the type information and the control mode, and determining the control mode and the non-wireless communication behavior corresponding to the instruction information includes step S501.

At step S501, the non-wireless communication behavior is determined based on the identification information and the first association, and the control mode is determined based on the identification information and the second association; and/or the non-wireless communication behavior is determined based on the type information and the first association, and the control mode is determined based on the type information and the second association.

In an embodiment, the instruction information may carry the identification information of the non-wireless communication behavior to be controlled, and the terminal device may determine the non-wireless communication behavior to be controlled based on the first association and the identification information, as well as determine the control mode based on the second association and the identification information.

The base station may determine the non-wireless communication behavior to be controlled as well as its identification information as needed, and then carry the identification information in the instruction information to be transmitted to the terminal device, thereby instructing the terminal device to control the non-wireless communication behavior in the corresponding control mode.

In an embodiment, the instruction information, which is from the base station, may carry the type information of the base station, and the terminal device may determine the non-wireless communication behavior to be controlled based on the first association and the type information, as well as determine the control mode based on the second association and the type information.

For different types of base stations, the non-wireless communication behaviors to be controlled and the control modes may be different. The instruction information transmitted from the base station to the terminal device may carry the type information of the base station from which the instruction information is transmitted. In this way, the terminal device may receive the instruction information from different base stations within the coverage of the different base stations, to acquire the type of the base station from the instruction information, and then determine, based on the type of the base station, the non-wireless communication behavior to be controlled by the base station with that type, as well as the control mode.

FIG. 6 is a schematic flowchart illustrating a behavior control method according to yet another embodiment of the present disclosure. As shown in FIG. 6, in some embodiments, the instruction information further carries type information of a neighboring base station of the base station, and the method includes step S601 in addition to steps S401-S403.

At step S601, the control mode and/or the non-wireless communication behavior corresponding to the instruction information are determined based on the type information of the neighboring base station, when accessing the neighboring base station.

In an embodiment, the non-wireless communication behaviors to be controlled and the control modes may be different for different types of base stations. The base station may acquire the type information of the neighboring base station, and then carry the type information of the neighboring base station in the instruction information to be transmitted to the terminal device. When the terminal device accesses the neighboring base station (e.g., resides on the neighboring base station or establishes a communication connection with the neighboring base station), the terminal device may determine the non-wireless communication behavior to be controlled by the neighboring base station and the corresponding control mode directly based on the type information of the neighboring base station. In this way, upon receiving the instruction information from the neighboring base station, the terminal device may timely control the non-wireless communication behavior in the corresponding control mode.

FIG. 7 is a schematic flowchart illustrating a behavior control method according to yet another embodiment of the present disclosure. As shown in FIG. 7, in some embodiments, the method includes step S701 in addition to steps S401-S403.

At step S701, at least one of the following is determined based on the instruction information: a control duration for the non-wireless communication behavior, or a control magnitude for the non-wireless communication behavior.

In an embodiment, in addition to instructing the terminal device the non-wireless communication behavior to be controlled and the corresponding control mode via the instruction information, the base station may instruct the terminal device a specific control duration, control magnitude, and the like via the instruction information.

The control duration is a duration in which the non-wireless communication behavior is controlled in the control mode, and the control magnitude is a magnitude of control of the non-wireless communication behavior in the control mode.

For example, the non-wireless communication behavior is the audio output behavior, the control mode is Turn Down, the control duration is 20 minutes, and the control magnitude is 50%, then the terminal device may reduce its audio output volume by 50% and hold it for 20 minutes.

Accordingly, more accurate control of the terminal device can be realized, which is conducive to improving the user experience.

FIG. 8 is a schematic flowchart illustrating a behavior control method according to yet another embodiment of the present disclosure and includes steps S701, S401 and S402. As shown in FIG. 8, in some embodiments, the control duration is determined based on the instruction information, and controlling the non-wireless communication behavior in the control mode includes step S801.

At step S801, the non-wireless communication behavior is controlled in the control mode for the control duration.

In an embodiment, the base station may determine the control duration based on location information and/or historical path information of the terminal device. For example, the base station may predict, based on the location information and/or the historical path information of the terminal device, how much more time it will take for the terminal device to leave the environment where the non-wireless communication behavior is to be restricted, and then determine the control duration based on that time.

In the case of travel of the terminal device on the subway, as an example, the historical path information of the terminal device starts from station A and arrives at the station E via station B, station C, and station D in turn, for example. In order to simplify the description, it is assumed that four segments AB, BC, CD, and DE have the same lengths, and a total time from station A to station E is 40 minutes.

When a base station located in the vicinity of station D determines that the terminal device travels from station A to station D via stations B and C (for example, based on communication with other base stations that the terminal device passes through along the way), it may be determined that the terminal device ends at station E based on the historical path information of the terminal device, i.e., the terminal device still needs to travel a distance of DE on the subway to leave the subway car, and it may be determined that the duration for the terminal device to travel from station D to station E is 10 minutes. Then the instruction information may be configured to instruct the terminal device that the control duration is 10 minutes.

For example, for the control of the audio output of the terminal device, the terminal device may be controlled to mute for 10 minutes from station D to station E, and after 10 minutes, the terminal device may be unmuted and output sound normally. Accordingly, on the one hand, it is possible to ensure that the terminal device remains muted during travel from station D to station E on the subway, so as to avoid affecting other passengers. On the other hand, it is possible to accurately determine the duration the terminal device is in the environment where its behavior is to be restricted. For example, after the aforementioned 10 minutes, it may be predicted that the terminal device has left the subway car, and even if the terminal device is still within coverage of the base station in the vicinity of station D, the terminal device may be unmuted so as to avoid adverse effects on the user of the terminal device.

It should be noted that in order to determine the control duration more accurately, on the basis of considering the location information and/or the historical path information, time information may be further considered, such as determining the historical path information of the terminal device at the current time, and then performing the above steps based on the determined historical path information.

FIG. 9 is a schematic flowchart illustrating a behavior control method according to yet another embodiment of the present disclosure and includes steps S701, S401, and S402. As shown in FIG. 9, in some embodiments, the control magnitude is determined based on the instruction information, and controlling the non-wireless communication behavior in the control mode includes step S901.

At step S901, the non-wireless communication behavior is controlled with the control magnitude in the control mode.

In an embodiment, the base station may determine the control magnitude based on the time information and the location information of the terminal device. For example, the base station may predict, based on the time information and the location information of the terminal device, a density of passengers in the environment where the terminal device is currently located, and then determine the control magnitude based on the density.

As an example, the terminal device is travelling on the subway, and the audio output of the terminal device is controlled. For example, the time information is 8:00 a.m., and there are a larger number of passengers boarding and alighting at the station where the terminal device is located. It may be determined that the density of passengers in the environment where the terminal device is located is relatively high, then the terminal device may be controlled to lower its volume with a large magnitude, for example, lower its volume to mute at most. For example, the time information is 10:00 p.m., and there are fewer passengers boarding and alighting near the station where the terminal device is located. It may be determined that the density of passengers in the environment where the terminal device is located is relatively low, then the terminal device may still be controlled to lower its volume with a small magnitude.

Accordingly, on the one hand, it is possible to ensure that the volume of the terminal device may not be too loud during the subway ride, so as to avoid affecting other passengers. On the other hand, it is possible to accurately determine the density of passengers in the environment where the behavior of the terminal device is to be restricted, and determine, based on the density, the adjustment magnitude of the volume, so as to avoid affecting the user experience due to lowering of the volume too much in the case of very few or even no passengers on the subway.

In an embodiment, the instruction information is from the base station, and the method further includes: in response to leaving the base station, stopping controlling the non-wireless communication behavior in the control mode.

In an embodiment, after the terminal device leaves the base station, control of the non-wireless communication behavior in the control mode instructed by the base station may be stopped. For example, the non-wireless communication behavior is the audio output behavior and the control mode is to be muted, then the terminal device may resume normal audio playback and no longer be muted after leaving the base station.

The terminal device leaving the base station may mean that communication connection between the terminal device and the base station is disconnected, or that the terminal device is switched from residing at the base station to residing at another base station, which may be set as needed.

Corresponding to the foregoing embodiments of the control instruction method and the behavior control method, the present disclosure further provides embodiments of a control instruction apparatus and a behavior control apparatus.

Figure 10:
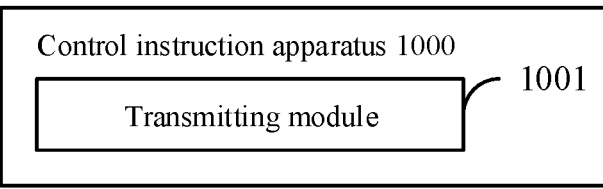
FIG. 10 is a schematic block diagram illustrating a control instruction apparatus according to an embodiment of the present disclosure.

FIG. 10 is a schematic block diagram illustrating a control instruction apparatus 1000 according to an embodiment of the present disclosure. The control instruction apparatus shown in this embodiment is applicable to a base station, which includes but is not limited to a base station in a communication system such as a 4G base station, a 5G base station, and a 6G base station. The base station may communicate with a terminal device serving as user equipment, which includes but is not limited to a communication apparatus such as a mobile phone, a tablet computer, a wearable device, a sensor, and an IoT device.

As shown in FIG. 10, the control instruction apparatus 1000 may include: a transmitting module 1001 configured to transmit a control effective condition and instruction information to a terminal device. Where the instruction information is configured to instruct the terminal device to control a non-wireless communication behavior corresponding to the instruction information in a control mode corresponding to the instruction information when the terminal device satisfies the control effective condition.

In some embodiments, the control effective condition includes at least one of: a location condition, a terminal type condition, or a service type condition.

In some embodiments, the terminal device satisfying the location condition includes at least one of: the terminal device being located within a target cell; the terminal device being located at target coordinates; or the terminal device being located at a target altitude.

In some embodiments, the control effective condition and the instruction information are transmitted to the terminal device in a mode including at least one of: broadcast, multicast, or unicast.

In some embodiments, a first association between the instruction information and the non-wireless communication behavior is pre-negotiated between the base station and the terminal device, is determined by the base station and transmitted to the terminal device in advance, or is pre-stored in the terminal device; and/or a second association between the instruction information and the control mode is pre-negotiated between the base station and the terminal device, is determined by the base station and transmitted to the terminal device in advance, or is pre-stored in the terminal device.

In some embodiments, the instruction information carries at least one of: identification information of the non-wireless communication behavior or type information of the base station, where the instruction information is configured to instruct the terminal device to determine, based on the identification information and/or the type information, the control mode and/or the non-wireless communication behavior corresponding to the instruction information.

In some embodiments, the instruction information further carries type information of a neighboring base station of the base station, where the instruction information is further configured to instruct the terminal device to determine, based on the type information of the neighboring base station, the control mode and/or the non-wireless communication behavior corresponding to the instruction information, when the terminal device accesses the neighboring base station.

In some embodiments, the base station includes at least one of: a subway base station or a high-speed railway base station.

In some embodiments, the non-wireless communication behavior includes at least one of: an audio output behavior, a display behavior, a prompt behavior, or a power supply behavior.

In some embodiments, the instruction information is further configured to instruct at least one of: a control duration for the non-wireless communication behavior, or a control magnitude for the non-wireless communication behavior.

Figure 11:
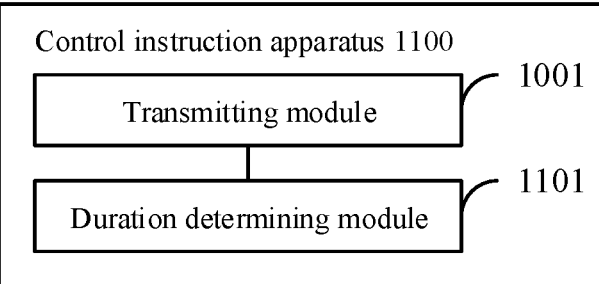
FIG. 11 is a schematic block diagram illustrating a control instruction apparatus according to another embodiment of the present disclosure.

FIG. 11 is a schematic block diagram illustrating a control instruction apparatus 1100 according to another embodiment of the present disclosure. As shown in FIG. 11, in response to the instruction information being further configured to instruct the control duration, the apparatus includes a duration determining module 1101 in addition to the transmitting module 1001.

The duration determining module 1101 is configured to determine the control duration based on location information and/or historical path information of the terminal device.

Figure 12:
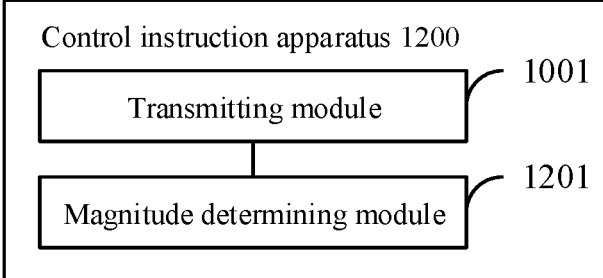
FIG. 12 is a schematic block diagram illustrating a control instruction apparatus according to yet another embodiment of the present disclosure.

FIG. 12 is a schematic block diagram illustrating a control instruction apparatus 1200 according to yet another embodiment of the present disclosure. As shown in FIG. 12, in response to the instruction information being further configured to instruct the control magnitude, the apparatus 1200 includes a magnitude determining module 1201 in addition to the transmitting module 1001.

The magnitude determining module 1201 is configured to determine the control magnitude based on time information and/or the location information of the terminal device.

Figure 13:
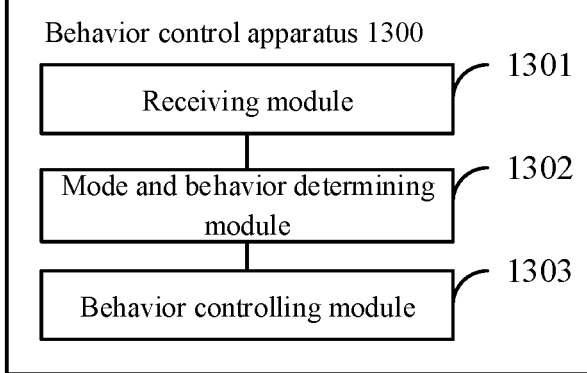
FIG. 13 is a schematic block diagram illustrating a behavior control apparatus according to an embodiment of the present disclosure.

FIG. 13 is a schematic block diagram illustrating a behavior control apparatus 1300 according to an embodiment of the present disclosure. The behavior control apparatus 1300 shown in this embodiment is applicable to a terminal device, which includes but is not limited to a communication apparatus such as a mobile phone, a tablet computer, a wearable device, a sensor, and an IoT device. The terminal device, as user equipment, may communicate with a base station, which includes but is not limited to a base station in a communication system such as a 4G base station, a 5G base station, and a 6G base station.

As shown in FIG. 13, the behavior control apparatus may include a receiving module 1301, a mode and behavior determining module 1302, and a behavior controlling module 1303.

The receiving module 1301 is configured to receive a control effective condition and instruction information.

The mode and behavior determining module 1302 is configured to determine a control mode and a non-wireless communication behavior corresponding to the instruction information.

The behavior controlling module 1303 is configured to control the non-wireless communication behavior in the control mode, in response to the terminal device satisfying the control effective condition.

In some embodiments, the control effective condition includes at least one of: a location condition, a terminal type condition, or a service type condition.

In some embodiments, the terminal device satisfying the location condition includes at least one of: the terminal device being located within a target cell; the terminal device being located at target coordinates; or the terminal device being located at a target altitude.

In some embodiments, a first association between the instruction information and the non-wireless communication behavior is pre-negotiated between the base station and the terminal device, or is determined by the base station and transmitted to the terminal device in advance; and/or a second association between the instruction information and the control mode is pre-negotiated between the base station and the terminal device, or is determined by the base station and transmitted to the terminal device in advance.

In some embodiments, the instruction information includes at least one of: identification information of the non-wireless communication behavior or type information of the base station. Where the first association is an association between the identification information and the non-wireless communication behavior, and the second association is an association between the identification information and the control mode; and/or the first association is an association between the type information and the non-wireless communication behavior, and the second association is an association between the type information and the control mode. The mode and behavior determining module is configured to: determine the non-wireless communication behavior based on the identification information and the first association, and determine the control mode based on the identification information and the second association; and/or determine the non-wireless communication behavior based on the type information and the first association, and determine the control mode based on the type information and the second association.

In some embodiments, the instruction information further carries type information of a neighboring base station of the base station, and the mode and behavior determining module is further configured to determine, based on the type information of the neighboring base station, the control mode and/or the non-wireless communication behavior corresponding to the instruction information, when accessing the neighboring base station.

In some embodiments, the base station includes at least one of: a subway base station or a high-speed railway base station.

In some embodiments, the non-wireless communication behavior includes at least one of: an audio output behavior, a display behavior, a prompt behavior, or a power supply behavior.

Figures 14, 15:
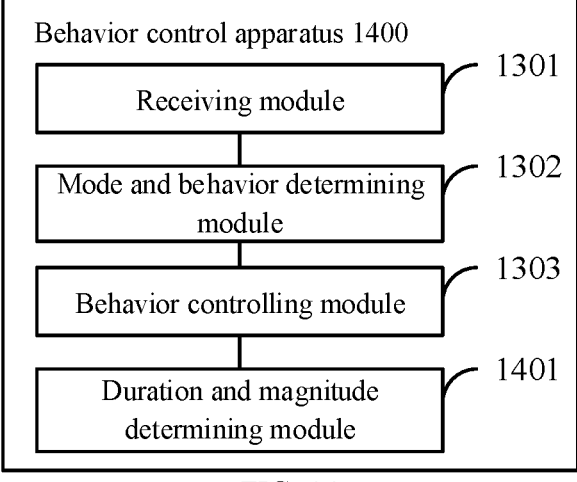
FIG. 14 is a schematic block diagram illustrating a behavior control apparatus according to another embodiment of the present disclosure.
FIG. 15 is a schematic block diagram illustrating an apparatus for control instruction according to an embodiment of the present disclosure.

FIG. 14 is a schematic block diagram illustrating a behavior control apparatus 1400 according to another embodiment of the present disclosure. As shown in FIG. 14, the apparatus 1400 includes a duration and magnitude determining module 1401 in addition to the receiving module 1301, the mode and behavior determining module 1302, and the behavior controlling module 1303.

The duration and magnitude determining module 1401 is configured to determine, based on the instruction information, at least one of: a control duration for the non-wireless communication behavior, or a control magnitude for the non-wireless communication behavior.

In some embodiments, in response to determining the control duration based on the instruction information, the behavior controlling module is configured to control the non-wireless communication behavior in the control mode for the control duration.

In some embodiments, in response to determining the control magnitude based on the instruction information, the behavior controlling module is configured to control the non-wireless communication behavior with the control magnitude in the control mode.

With respect to the apparatuses in the above embodiments, the specific manner in which each module performs an operation has been described in detail in the relevant method embodiments, and will not be described in detail herein.

For the apparatus embodiments, since they basically correspond to the method embodiments, reference may be made to part of the description of the method embodiments for the relevant portions. The apparatus embodiments as described above are merely illustrative, where the modules described as separated components may or may not be physically separated, and components shown as modules may or may not be physical modules, i.e., may be located in one place, or may be distributed over a plurality of network modules. Some or all of the modules may be selected according to actual needs to achieve the purpose of the disclosed solution. Those ordinary skilled in the art can understand and implement it without paying any creative efforts.

The present disclosure further provides a communication apparatus, including: a processor; and a memory storing a computer program.

Where the computer program is executed by the processor to perform the control instruction method and/or the behavior control method according to any one of the above embodiments.

The present disclosure further provides a computer-readable storage medium storing a computer program, which is executed by a processor to perform steps in the control instruction method and/or the behavior control method according to any one of the above embodiments.

As shown in FIG. 15, FIG. 15 is a schematic block diagram illustrating an apparatus 1500 for control instruction according to an embodiment of the present disclosure. The apparatus 1500 may be provided as a base station.

Referring to FIG. 15, the apparatus 1500 includes a processing component 1522, a wireless transmitting/receiving component 1524, an antenna component 1526, and a signal processing portion specific to a wireless interface. The processing component 1522 may further include one or more processors (not shown). One of the processors in the processing component 1522 may be configured to perform the control instruction method according to any one of the above embodiments.

Figure 16:
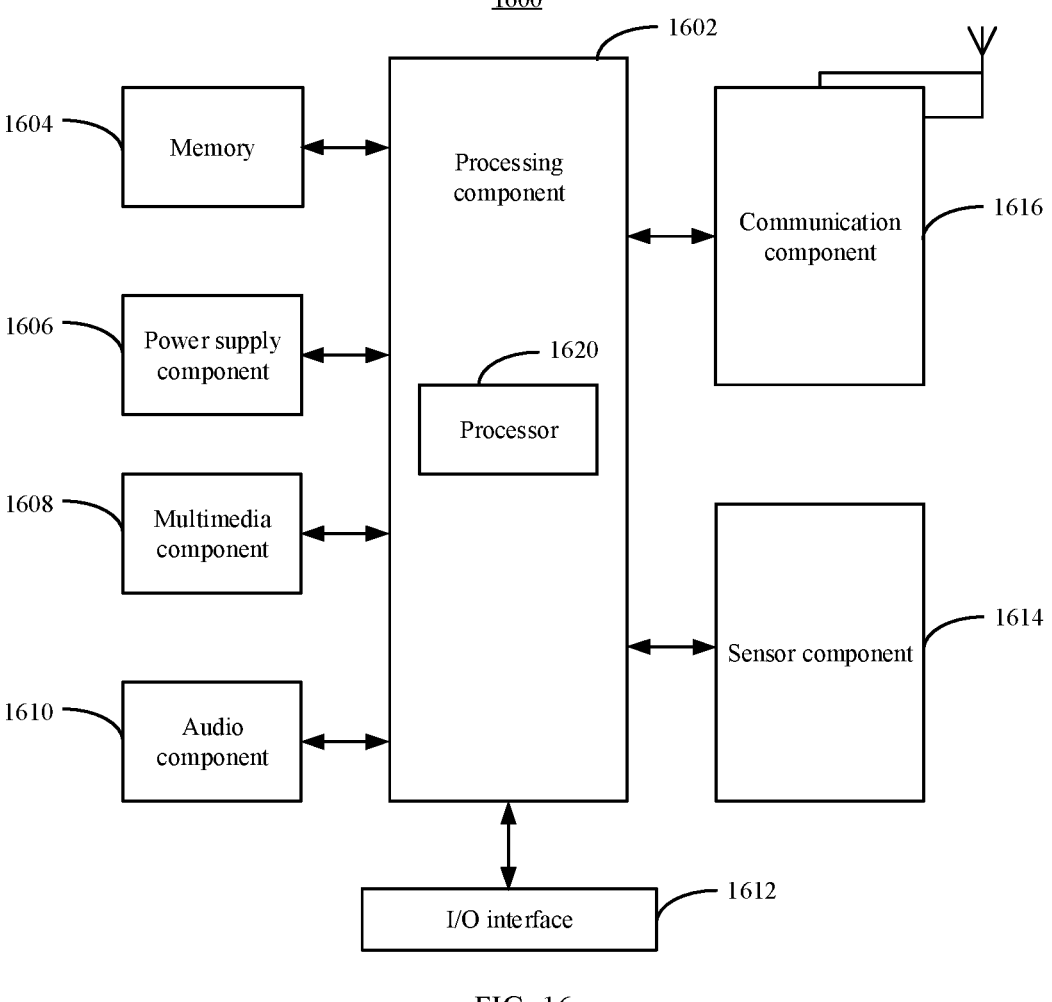
FIG. 16 is a schematic block diagram illustrating an apparatus for behavior control according to an embodiment of the present disclosure.

FIG. 16 is a schematic block diagram illustrating an apparatus 1600 for behavior control according to an embodiment of the present disclosure. For example, the apparatus 1600 may be a mobile phone, a computer, a digital broadcast terminal, a message transceiver device, a game console, a tablet device, a medical device, a fitness device, a personal digital assistant, etc.

Referring to FIG. 16, the apparatus 1600 may include one or more of a processing component 1602, a memory 1604, a power supply component 1606, a multimedia component 1608, an audio component 1610, an input/output (I/O) interface 1612, a sensor component 1614, and a communication component 1616.

The processing component 1602 generally controls overall operations of the apparatus 1600, such as operations associated with display, a telephone call, data communication, a camera operation, and a record operation. The processing component 1602 may include one or more processors 1620 for executing instructions to complete all or a part of steps in the above behavior control method. Further, the processing component 1602 may include one or more modules to facilitate interaction between the processing component 1602 and another component. For example, the processing component 1602 may include a multimedia module to facilitate interaction between the multimedia component 1608 and the processing component 1602.

The memory 1604 is configured to store various types of data to support operations at the apparatus 1600. Examples of such data include instructions for any application or method operated on the apparatus 1600, contact data, phonebook data, messages, pictures, videos, and so on. The memory 1604 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk, or a compact disk.

The power supply component 1606 supplies power to various components of the apparatus 1600. The power supply component 1606 may include a power supply management system, one or more power supplies, and other components associated with generating, managing and distributing power for the apparatus 1600.

The multimedia component 1608 includes a screen for providing an output interface between the apparatus 1600 and a user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, swipes and gestures on the touch panel. The touch sensors may not only sense a boundary of a touch or swipe action, but also detect duration and pressure associated with the touch or swipe action. In some embodiments, the multimedia component 1608 includes a front camera and/or a rear camera. When the apparatus 1600 is in an operation mode, such as a shooting mode or a video mode, the front camera and/or the rear camera may receive external multimedia data. Each of the front and rear cameras may be a fixed optical lens system or have a focal length and an optical zoom capability.

The audio component 1610 is configured to output and/or input an audio signal. For example, the audio component 1610 includes a microphone (MIC). When the apparatus 1600 is in an operation mode, such as a call mode, a record mode and a voice recognition mode, the microphone is configured to receive an external audio signal. The received audio signal may be further stored in the memory 1604 or transmitted via the communication component 1616. In some embodiments, the audio component 1610 further includes a speaker for outputting an audio signal.

The I/O interface 1612 provides an interface between the processing component 1602 and a peripheral interface module. The peripheral interface module may be a keyboard, a click wheel, a button, or the like. The button may include but is not limited to, a home button, a volume button, a start button, and a lock button.

The sensor component 1614 includes one or more sensors for providing a state assessment in various aspects for the apparatus 1600. For example, the sensor component 1614 may detect an on/off state of the apparatus 1600, and relative positioning between components, which are, for example, a display and a keypad of the apparatus 1600. The sensor component 1614 may also detect a position change of the apparatus 1600 or a component of the apparatus 1600, presence or absence of a touch of a user on the apparatus 1600, an orientation or acceleration/deceleration of the apparatus 1600, and a temperature change of the apparatus 1600. The sensor component 1614 may include a proximity sensor configured to detect the presence of a nearby object without any physical contact. The sensor component 1614 may further include an optical sensor, such as a CMOS or CCD image sensor used in an imaging application. In some embodiments, the sensor component 1614 may further include an acceleration sensor, a gyro sensor, a magnetic sensor, a pressure sensor, or a temperature sensor.

The communication component 1616 is configured to facilitate wired or wireless communication between the apparatus 1600 and other devices. The apparatus 1600 may access a wireless network based on a communication standard, such as WiFi, 2G or 3G, 4G LTE, 5G NR, or a combination thereof. In an exemplary embodiment, the communication component 1616 receives a broadcast signal or broadcast-related information from an external broadcast management system via a broadcast channel. In an exemplary embodiment, the communication component 1616 further includes a Near Field Communication (NFC) module for promoting short-range communication. For example, the NFC module may be implemented based on radio frequency identification (RFID) technology, infrared data association (IrDA) technology, ultra-wideband (UWB) technology, Bluetooth® (BT) technology and other technologies. The Bluetooth® technology includes one or more of the BLUETOOTH Core Specifications, such as version 5.2 (dated 31 Dec. 2019).

In an exemplary embodiment, the apparatus 1600 may be implemented by one or more of application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components, for executing the above behavior control method.

In an exemplary embodiment, there is further provided a non-transitory computer-readable storage medium including instructions, such as the memory 1604, including instructions. The above instructions may be executed by the processor 1620 of the apparatus 1600 to complete the above behavior control method. For example, the non-transitory computer-readable storage medium may be an ROM, a Random Access Memory (RAM), a CD-ROM, a magnetic tape, a floppy disk, and an optical data storage device, etc.

Other embodiments of the present disclosure will readily occur to those skilled in the art upon consideration of the specification and practice of the disclosure disclosed herein. The present disclosure is intended to cover any variations, uses, or adaptations of the present disclosure that follow the general principles of the present disclosure and include common general knowledge or conventional technical means in the art not disclosed herein. The specification and embodiments are to be considered exemplary only, with a true scope and spirit of the present disclosure being indicated by the following claims.

It should be understood that the present disclosure is not limited to the precise structures which have been described above and shown in the accompanying drawings, and that various modifications and changes may be made without departing from the scope thereof. The scope of the present disclosure is limited only by the appended claims.

It should be noted that, relational terms such as first and second are used herein only to distinguish one entity or operation from another, and do not necessarily require or imply the presence of any such actual relationship or order between these entities or operations. Terms "include", "comprise", or any other variants thereof, are intended to cover non-exclusive inclusion, such that a process, method, article, or device including a series of elements includes not only those elements, but also other elements that are not expressly listed, or elements that are inherent to such a process, method, article, or device. Without further limitations, an element defined by the phrase "include a . . . " does not exclude the presence of additional identical elements in the process, method, article, or device including the element.

The methods and apparatuses provided by the embodiments of the present disclosure have been described in detail above. Specific examples are used herein to illustrate the principles and implementations of the present disclosure. The description of the above embodiments is only used to assist in understanding of the methods of the present disclosure and core ideas thereof. Meanwhile, for those ordinary skilled in the art, there will be changes in the specific implementations and the scope of application based on the ideas of the present disclosure. In summary, the contents in this specification should not be construed as limiting the present disclosure.

The invention claimed is:

1. A control instruction method, applicable to a base station, the method comprising:

transmitting a control effective condition and instruction information to a terminal device, wherein the terminal device controls a non-wireless communication behavior corresponding to the instruction information in a control mode corresponding to the instruction information in response to the terminal device satisfying the control effective condition;

wherein the instruction information carries type information of a neighboring base station of the base station, wherein the terminal device determines, based on the type information of the neighboring base station, the control mode and/or the non-wireless communication behavior corresponding to the instruction information, in response to the terminal device accessing the neighboring base station.

2. The method according to claim 1, wherein the control effective condition comprises at least one of:

a location condition, a terminal type condition, or a service type condition.

3. The method according to claim 2, wherein the terminal device satisfying the location condition comprises at least one of:

the terminal device being located within a target cell;

the terminal device being located at target coordinates; or the terminal device being located at a target altitude.

4. The method according to claim 1, wherein the control effective condition and the instruction information are transmitted to the terminal device in a mode comprising at least one of:

broadcast, multicast, or unicast, wherein the base station comprises at least one of:

a subway base station or a high-speed railway base station, and wherein the non-wireless communication behavior comprises at least one of:

an audio output behavior, a display behavior, a prompt behavior, or a power supply behavior.

5. The method according to claim 1, wherein a first association between the instruction information and the non-wireless communication behavior is achieved by one of:

being pre-negotiated between the base station and the terminal device, being determined by the base station and transmitted to the terminal device in advance, or being pre-stored in the terminal device; and/or a second association between the instruction information and the control mode is achieved by one of:

being pre-negotiated between the base station and the terminal device, being determined by the base station and transmitted to the terminal device in advance, or being pre-stored in the terminal device.

6. The method according to claim 1, wherein the instruction information carries at least one of:

identification information of the non-wireless communication behavior or type information of the base station, wherein the instruction information is configured to instruct the terminal device to determine, based on the identification information and/or the type information, the control mode and/or the non-wireless communication behavior corresponding to the instruction information.

7. The method according to claim 1, wherein the instruction information is further configured to instruct at least one of:

a control duration for the non-wireless communication behavior, or a control magnitude for the non-wireless communication behavior, wherein in response to the instruction information being further configured to instruct the control duration, the method further comprises:

determining the control duration based on location information and/or historical path information of the terminal device; and in response to the instruction information being further configured to instruct the control magnitude, the method further comprises:

determining the control magnitude based on time information and/or the location information of the terminal device.

8. A behavior control method, applicable to a terminal device, the method comprising:

receiving a control effective condition and instruction information;

determining a control mode and a non-wireless communication behavior corresponding to the instruction information; and controlling the non-wireless communication behavior in the control mode, in response to the terminal device satisfying the control effective condition;

wherein the instruction information is from a base station and the instruction information carries type information of a neighboring base station of the base station, and the method further comprises:

determining, based on the type information of the neighboring base station, the control mode and/or the non-wireless communication behavior corresponding to the instruction information, in response to accessing the neighboring base station.

9. The method according to claim 8, wherein the control effective condition comprises at least one of:

a location condition, a terminal type condition, or a service type condition.

10. The method according to claim 9, wherein the terminal device satisfying the location condition comprises at least one of:

the terminal device being located within a target cell;

the terminal device being located at target coordinates; or the terminal device being located at a target altitude.

11. The method according to claim 8, wherein a first association between the instruction information and the non-wireless communication behavior is achieved by one of:

being pre-negotiated between a base station and the terminal device, being determined by the base station and transmitted to the terminal device in advance, or being pre-stored in the terminal device; and/or a second association between the instruction information and the control mode is achieved by one of:

being pre-negotiated between the base station and the terminal device, being determined by the base station and transmitted to the terminal device in advance, or being pre-stored in the terminal device.

12. The method according to claim 11, wherein the instruction information comprises at least one of:

identification information of the non-wireless communication behavior or type information of the base station, the first association is an association between the identification information and the non-wireless communication behavior, and the second association is an association between the identification information and the control mode; and/or the first association is an association between the type information and the non-wireless communication behavior, and the second association is an association between the type information and the control mode, and determining the control mode and the non-wireless communication behavior corresponding to the instruction information comprises at least one of:

determining the non-wireless communication behavior based on the identification information and the first association, and determining the control mode based on the identification information and the second association; or determining the non-wireless communication behavior based on the type information and the first association, and determining the control mode based on the type information and the second association.

13. The method according to claim 8, wherein the instruction information is from a base station, and the base station comprises at least one of:

a subway base station or a high-speed railway base station, and wherein the non-wireless communication behavior comprises at least one of:

an audio output behavior, a display behavior, a prompt behavior, or a power supply behavior.

14. The method according to claim 8, further comprising:

determining, based on the instruction information, at least one of:

a control duration for the non-wireless communication behavior, or a control magnitude for the non-wireless communication behavior, wherein in response to determining the control duration based on the instruction information, controlling the non-wireless communication behavior in the control mode comprises:

controlling the non-wireless communication behavior in the control mode for the control duration; and in response to determining the control magnitude based on the instruction information, controlling the non-wireless communication behavior in the control mode comprises:

controlling the non-wireless communication behavior with the control magnitude in the control mode.

15. A communication apparatus, comprising:

a processor; and a memory storing a computer program, wherein the computer program is executed by the processor to perform operations comprising:

transmitting a control effective condition and instruction information to a terminal device, wherein the terminal device controls a non-wireless communication behavior corresponding to the instruction information in a control mode corresponding to the instruction information in response to the terminal device satisfying the control effective condition;

wherein the instruction information carries type information of a neighboring base station of the base station, wherein the terminal device determines, based on the type information of the neighboring base station, the control mode and/or the non-wireless communication behavior corresponding to the instruction information, in response to the terminal device accessing the neighboring base station.

16. A non-transitory computer-readable storage medium storing a computer program, wherein the computer program is executed by a processor to perform the control instruction method according to claim 1.

17. A non-transitory computer-readable storage medium storing a computer program, wherein the computer program is executed by a processor to perform the behavior control method according to claim 8.

18. The communication apparatus according to claim 15, wherein the control effective condition comprises at least one of:

a location condition, a terminal type condition, or a service type condition.

19. The communication apparatus according to claim 18, wherein the terminal device satisfying the location condition comprises at least one of:

the terminal device being located within a target cell;

the terminal device being located at target coordinates; or the terminal device being located at a target altitude.

20. The communication apparatus according to claim 15, wherein the control effective condition and the instruction information are transmitted to the terminal device in a mode comprising at least one of:

broadcast, multicast, or unicast, wherein the base station comprises at least one of:

a subway base station or a high-speed railway base station, and wherein the non-wireless communication behavior comprises at least one of:

an audio output behavior, a display behavior, a prompt behavior, or a power supply behavior.

\* \* \* \* \*